US010925129B2

(12) United States Patent
Qiu (10) Patent No.: US 10,925,129 B2
(45) Date of Patent: Feb. 16, 2021

(54) ILLUMINATION SYSTEM INCLUDING TUNABLE LIGHT ENGINE

(71) Applicant: Lumileds LLC, San Jose, CA (US)

(72) Inventor: Yifeng Qiu, San Jose, CA (US)

(73) Assignee: Lumileds LLC, San Jose, CA (US)

( * ) Notice: Subject to any disclaimer, the term of this patent is extended or adjusted under 35 U.S.C. 154(b) by 0 days.

(21) Appl. No.: 16/856,979

(22) Filed: Apr. 23, 2020

(65) Prior Publication Data
US 2020/0260545 A1    Aug. 13, 2020

Related U.S. Application Data

(63) Continuation of application No. 16/197,347, filed on Nov. 20, 2018, now Pat. No. 10,674,576, which is a continuation of application No. 15/848,959, filed on Dec. 20, 2017, now Pat. No. 10,136,489.

(51) Int. Cl.
H05B 45/10    (2020.01)
H05B 45/20    (2020.01)
H05B 45/00    (2020.01)

(52) U.S. Cl.
CPC ............. H05B 45/10 (2020.01); H05B 45/00 (2020.01); H05B 45/20 (2020.01)

(58) Field of Classification Search
None
See application file for complete search history.

(56) References Cited

U.S. PATENT DOCUMENTS

| 9,320,097 | B2 | 4/2016 | Zhang et al. |
| 9,603,213 | B1 | 3/2017 | Suttles et al. |
| 9,967,944 | B2 | 5/2018 | Fang et al. |
| 10,136,489 | B1 | 11/2018 | Qiu |
| 2008/0119994 | A1 | 5/2008 | Kameyama |
| 2009/0243576 | A1* | 10/2009 | Kitano ............... H02J 7/34 323/282 |

(Continued)

FOREIGN PATENT DOCUMENTS

| TW | 201507544 A | 2/2015 |
| TW | 201933644 A | 8/2019 |

(Continued)

OTHER PUBLICATIONS

"U.S. Appl. No. 15/848,959, Notice of Allowance dated Jul. 17, 2018", 11 pgs.
"U.S. Appl. No. 16/197,347, Corrected Notice of Allowability dated Apr. 20, 2020", 2 pgs.
"U.S. Appl. No. 16/197,347, Final Office Action dated Jul. 26, 2019", 10 pgs.
"U.S. Appl. No. 16/197,347, Non Final Office Action dated Jan. 14, 2019", 6 pgs.

(Continued)

*Primary Examiner* — Crystal L Hammond
(74) *Attorney, Agent, or Firm* — Schwegman Lundberg & Woessner, P.A.

(57) ABSTRACT

A tunable illumination system is disclosed which splits a single channel output into three by means of current steering and/or time division and multiplexing techniques. More particularly, the tunable light system may split the input current into three pulse-width modulated (PWM) channels. The individual duty cycles of the PWM channels may be adjusted based on a control signal that is received via a control signal interface. The control signal interface may include a switch and/or other circuitry that is manipulated by the user when the user wants to change the color of light that is output by the illumination system.

22 Claims, 8 Drawing Sheets

(56) References Cited

U.S. PATENT DOCUMENTS

| | | | |
|---|---|---|---|
| 2010/0244704 A1* | 9/2010 | Takaki | H05B 45/60 |
| | | | 315/127 |
| 2011/0115407 A1 | 5/2011 | Wibben et al. | |
| 2011/0140627 A1 | 6/2011 | Kong et al. | |
| 2012/0038292 A1 | 2/2012 | Kuo et al. | |
| 2012/0146505 A1 | 6/2012 | Jonsson | |
| 2012/0262140 A1* | 10/2012 | Divan | H02M 3/156 |
| | | | 323/282 |
| 2013/0300305 A1 | 11/2013 | Wray | |
| 2014/0246990 A1 | 9/2014 | Kim et al. | |
| 2014/0300283 A1 | 10/2014 | Lee et al. | |
| 2014/0300284 A1 | 10/2014 | Lee et al. | |
| 2016/0323972 A1 | 11/2016 | Bora et al. | |
| 2017/0181242 A1 | 6/2017 | Johnson et al. | |
| 2017/0188420 A1* | 6/2017 | Kido | H05B 47/11 |
| 2017/0202071 A1 | 7/2017 | Chen et al. | |
| 2017/0223793 A1 | 8/2017 | Yeh et al. | |
| 2017/0318643 A1 | 11/2017 | Qiu et al. | |
| 2017/0374718 A1 | 12/2017 | Fang et al. | |
| 2018/0027626 A1 | 1/2018 | Wang et al. | |
| 2018/0070419 A1 | 3/2018 | Girard et al. | |
| 2018/0102672 A1 | 4/2018 | Qiu | |
| 2019/0191515 A1 | 6/2019 | Qiu | |

FOREIGN PATENT DOCUMENTS

| | | |
|---|---|---|
| WO | WO-2013173284 A1 | 11/2013 |
| WO | WO-2019126583 A1 | 6/2019 |

OTHER PUBLICATIONS

"U.S. Appl. No. 16/197,347, Notice of Allowance dated Jan. 23, 2020", 8 pgs.

"U.S. Appl. No. 16/197,347, Response filed Apr. 15, 2019 to Non Final Office Action dated Jan. 14, 2019", 11 pgs.

"U.S. Appl. No. 16/197,347, Response filed Dec. 25, 2019 to Final Office Action dated Jul. 26, 2019", 12 pgs.

"International Application Serial No. PCT/US2018/066954, International Search Report dated Apr. 2, 2019", 4 pgs.

"International Application Serial No. PCT/US2018/066954, Written Opinion dated Apr. 2, 2019", 7 pgs.

"Taiwanese Application Serial No. 107146263, First Office Action dated Dec. 25, 2019", 7 pgs.

"Taiwanese Application Serial No. 107146263, Response filed Mar. 26, 2020 to First Office Action dated Dec. 25, 2019", w/ English Claims, 11 pgs.

* cited by examiner

ILLUMINATION SYSTEM INCLUDING TUNABLE LIGHT ENGINE

CROSS-REFERENCE TO RELATED APPLICATIONS

The present application is a continuation of U.S. patent application Ser. No. 15/848,959 filed on Dec. 20, 2017, titled "ILLUMINATION SYSTEM INCLUDING TUNABLE LIGHT ENGINE". U.S. patent application Ser. No. 15/848,959 is incorporated herein.

FIELD

The present disclosure relates to light emitting devices in general, and more particularly, to an illumination system including a tunable light engine.

BACKGROUND

Light emitting diodes ("LEDs") are commonly used as light sources in various applications. LEDs are more energy-efficient than traditional light sources, providing much higher energy conversion efficiency than incandescent lamps and fluorescent light, for example. Furthermore, LEDs radiate less heat into illuminated regions and afford a greater breadth of control over brightness, emission color and spectrum than traditional light sources. These characteristics make LEDs an excellent choice for various lighting applications ranging from indoor illumination to automotive lighting. Accordingly, the need exists for improved LED-based illumination systems that harness the advantages of LEDs to provide high-quality illumination.

SUMMARY

The present disclosure addresses this need. According to aspects of the disclosure, an illumination system is disclosed comprising: a first signal generator configured to generate a first pulse-width modulated (PWM) signal based on a first control signal; a subtracting circuit configured to generate a second control signal based on a difference in voltage between a reference signal and the first control signal; a second signal generator configured to generate a second PWM signal based on a second control signal; a third signal generator configured to generate a third PWM signal based on at least one of the first PWM signal and the second PWM signal, the third PWM signal having a different duty cycle than at least one of the first PWM signal and the second PWM signal; a first light emitting diode (LED) that is powered using the first PWM signal, the first LED being configured to emit a first type of light; a second LED that is powered using the second PWM signal, the second LED having a second CCT, the second LED being configured to emit a second type of light, and a third LED that is powered using the third PWM signal, the third LED being configured to emit a third type of light.

BRIEF DESCRIPTION OF THE DRAWINGS

The drawings described below are for illustration purposes only. The drawings are not intended to limit the scope of the present disclosure. Like reference characters shown in the figures designate the same parts in the various embodiments.

DETAILED DESCRIPTION

Tunable illumination is highly desirable in consumer and commercial lighting. A tunable illumination system is usually able to change its color and brightness independently of one another. According to aspects of the disclosure, a tunable illumination system is disclosed which splits a single channel output into three by means of current steering and/or time division and multiplexing techniques. More particularly, the tunable light system may split the input current into three pulse-width modulated (PWM) channels. The individual duty cycles of the PWM channels may be adjusted based on a control signal that is received via a control signal interface. The control signal interface may include a switch and/or other circuitry that is manipulated by the user when the user wants to change the color of light that is output by the illumination system.

According to aspects of the disclosure, an illumination system is disclosed, comprising: a first signal generator configured to generate a first pulse-width modulated (PWM) signal based on a first control signal; a second signal generator configured to generate a second PWM signal based on a difference in voltage between a reference signal and the first control signal; a third signal generator configured to generate a third PWM signal based on the first PWM signal and the second PWM signal, the third PWM signal having a different duty cycle than at least one of the first PWM signal and the second PWM signal; a first light emitting diode (LED) that is powered using the first PWM signal, the first LED being configured to emit a first type of light; a second LED that is powered using the second PWM signal, the second LED having a second CCT, the second LED being configured to emit a second type of light; and a third LED that is powered using the third PWM signal, the third LED being configured to emit a third type of light.

According to aspects of the disclosure, a method is disclosed for operating an illumination system, comprising: generating a first pulse-width modulated (PWM) signal based on a first control signal; generating a second PWM signal based on a difference between a reference signal and the first control signal; generating a third PWM signal based on the first PWM signal and the second PWM signal, the third PWM signal having a different duty cycle than at least one of the first PWM signal and the second PWM signal; controlling a first light emitting diode (LED) based on the first PWM signal, the first LED being configured to output a first type of light; controlling a second LED based on the second PWM signal, the second LED being configured to output a second type of light; and controlling a third LED based on the third PWM signal, the third LED being configured to output a third type of light.

Examples of illumination systems will be described more fully hereinafter with reference to the accompanying drawings. These examples are not mutually exclusive, and features found in one example can be combined with features found in one or more other examples to achieve additional implementations. Accordingly, it will be understood that the examples shown in the accompanying drawings are provided for illustrative purposes only, and they are not intended to limit the disclosure in any way. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element such as a layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. It will be understood that these terms are intended to encompass different orientations of the element in addition to any orientation depicted in the figures.

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

Figure 1:
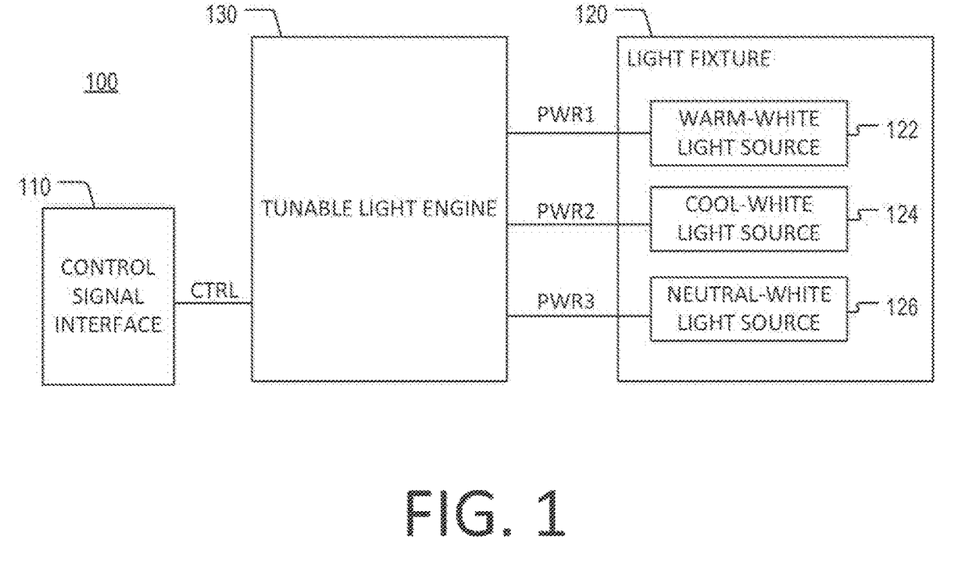
FIG. 1 is a schematic diagram of an illumination system, according to aspects of the disclosure.

FIG. 1 is a diagram of an example of an illumination system 100, according to aspects of the disclosure. The illumination system 100 may include a control signal interface 110, a light fixture 120, and a tunable light engine 130. In operation, the illumination system 100 may receive a user input via the control signal interface 110 and change the color of light that is output by the light fixture 120 based on the input. For example, if a first user input is received, the light fixture 120 may output light having a first color. By contrast, if a second user input is received, the light fixture 120 may output light having a second color that is different from the first color. In some implementations, the user may provide input to the illumination system by turning a knob or moving a slider that is part of the control signal interface 110. Additionally or alternatively, in some implementations, the user may provide input to the illumination system by using his or her smartphone, and/or another electronic device to transmit an indication of a desired color to the control signal interface 110.

The control signal interface 110 may include any suitable type of circuit or a device that is configured to generate a voltage signal CTRL and provide the voltage signal CTRL to the tunable light engine 130. Although in the present example the control signal interface 110 and the tunable light engine 130 are depicted as separate devices, alternative implementations are possible in which the control signal interlace 110 and the tunable light engine 130 are integrated together in the same device. For example, in some implementations, the control signal interface 110 may include a potentiometer coupled to a knob or slider, which is operable to generate the control signal CTRL based on the position of the knob (or slider). As another example, the control signal interface may include a wireless receiver (e.g., a Bluetooth receiver, a Zigbee receiver, a WiFi receiver, etc.) which is operable to receive one or more data items from a remote device (e.g., a smartphone or a Zigbee gateway) and output the control signal CTRL based on the data items. In some implementations, the one or mote data items may include a number identifying a desired correlated color temperature (CCT) to be output by the light fixture 120.

The light fixture 120 may include a warm-white light source 122, a cool-white light source 124, and a neutral-white light source 126. The warm-white light source 122 may include one or more LEDs that are configured to output white light having a CCT of approximately 2700K. The cool-white light source 124 may include one or more LEDs that are configured to output white light having a CCT of approximately 6500K. The neutral-white light source 126 may include one or more LEDs that are configured to output white light having a CCT of approximately 4000K.

The tunable light engine 130 may be configured to supply power to the light fixture 120 over three different channels. More particularly, the tunable light engine 130 may be configured to: supply a first PWM signal PWR1 to the warm-white light source 122 over a first channel; supply a second PWM signal PWR2 to the cool-white light source 124 over a second channel; and supply a third PWM signal PWR3 to the neutral-white light source 126 over a third channel. The signal PWR1 may be used to power the warm-white light source, and its duty cycle may determine the brightness of the warm-white light source. The signal PWR2 may be used to power the cool-white light source, and its duty cycle may determine the brightness of the cool-white light source. The signal PWR3 may be used to power the neutral-white light source, and its duty cycle may determine the brightness of the neutral-white light source. In operation, the tunable light engine may change the relative magnitude of the duty cycles of the signals PWR1, PWR2, and PWR3, to adjust the respective brightness of each one of light sources 122-126. As can be readily appreciated, varying the individual brightness of the light sources 122-126 may cause the output of the light fixture 120 to change color (and/or CCT). As noted above, the light output of the light fixture 120 may be the combination (e.g., a mix) of the light emissions produced by the light sources 122-126.

According to aspects of the disclosure, the tunable light engine 130 may include any suitable type of electronic device and/or electronic circuitry that is configured to generate the signals PWR1, PWR2, and PWR3. Although in the present examples, the signals PWR1-PWR3 are PWM signals, alternative implementations are possible in which the signals PWR1 are current signals, voltage signals, and/or any other suitable type of signal. Furthermore, although in the present example the light sources 122-126 are white light sources, alternative implementations are possible in which the light sources 122-126 are each configured to emit a different color of light. For example, the light source 122 may be configured to emit red light, the light source 126 may be configured to emit green light, and the light source 124 may be configured to emit blue light.

Figure 2:
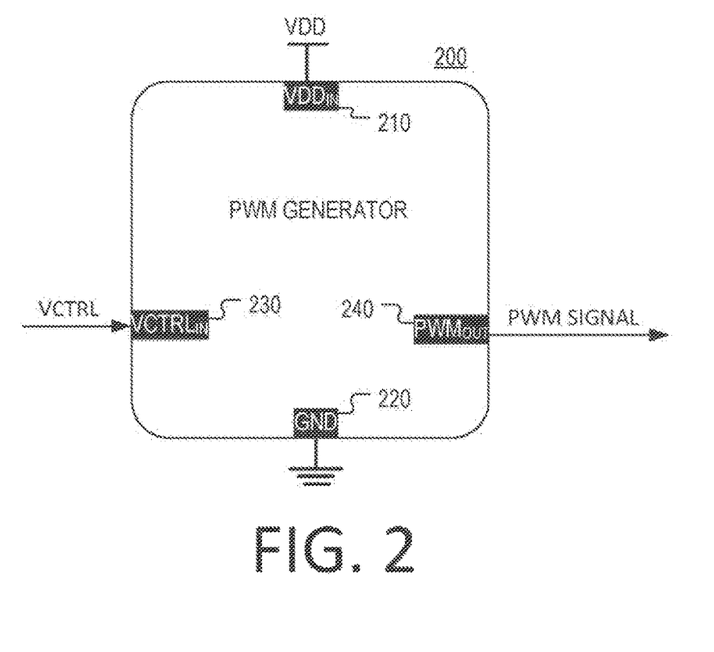
FIG. 2 is a schematic diagram of an example of a PWM signal generator, according to aspects of the disclosure.

FIG. 2 is a schematic diagram of an example of a PWM generator 200, according to aspects of the disclosure. The PWM generator 200 may include any suitable type of PWM generator. In some implementations, the PWM generator 200 may include a power-in terminal 210, a ground terminal 220, control terminal 230, and an output terminal 240. In operation, the PWM generator 200 may receive power at the power-in terminal 210 and a voltage control signal VCTRL at the control terminal 230. Based on the control signal VCTRL, the PWM generator 200 may generate a PWM signal and output the PWM signal from the output terminal 240.

Figure 3:
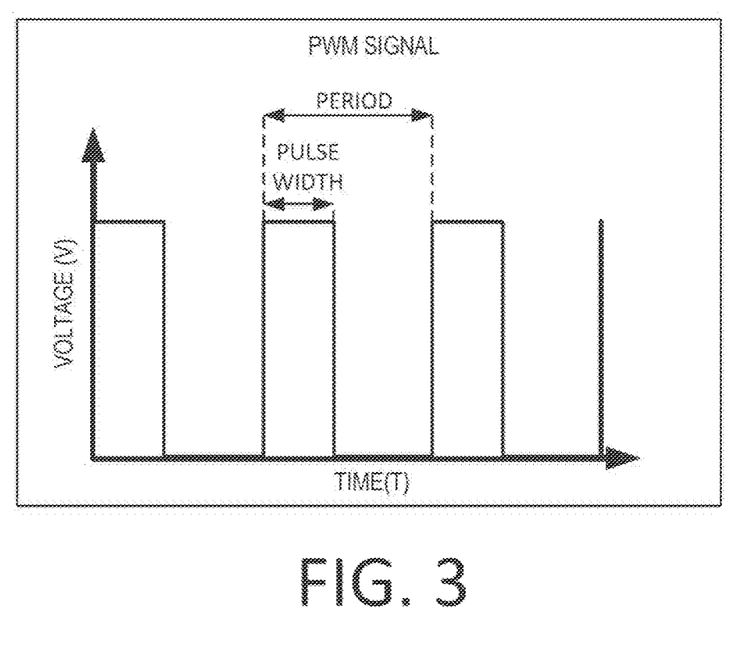
FIG. 3 is a diagram of an example of a PWM signal that is generated by the PWM signal generator of FIG. 2, according to aspects of the disclosure.

FIG. 3 is graph illustrating an example of a PWM signal which may be generated by the PWM generator 200. The PWM signal may have a period P and a pulse width W. The duty cycle of the PWM signal may be the proportion of each period P for which the PWM signal is on (e.g., high), and it may be described by Equation 1 below:

$$\text{DUTY CYCLE OF } PWM \text{ SIGNAL} = \frac{\text{PULSE WIDTH } W}{\text{PERIOD } P} \times 100 \quad \text{Equation 1}$$

Figure 4:
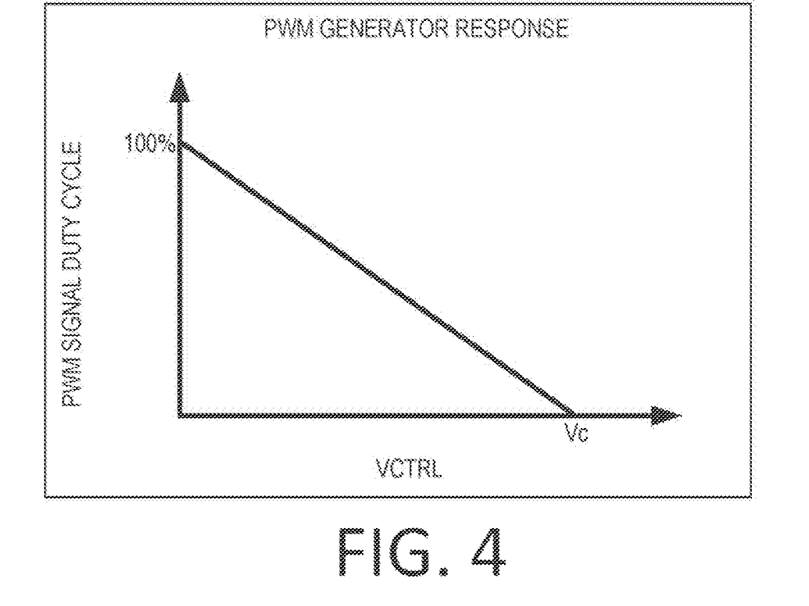
FIG. 4 is a graph illustrating the response of the PWM generator of FIG. 2 to changes in control voltage, according to aspects of the disclosure.

FIG. 4 is a graph illustrating the response of the PWM generator 200, according to aspects of the disclosure. As illustrated, when the control signal VCTRL has a first value (e.g., approximately 0V), the duty cycle of the PWM signal that is generated by the PWM signal generator 200 may be 100%, and when the control signal VCTRL has a second value Vc, the PWM generator 200 may be deactivated. Although not shown in FIG. 4, in some implementations, the signal generator 200 may be configured to set the duty cycle of the PWM signal at 100% when the value of the control signal VCTRL is in a predetermined range (e.g., 0V-0.4V). Configuring the signal generator 200 in this manner may ensure that outputting a PWM signal having a 100% duty cycle is always possible, as obtaining a control signal that is exactly 0V may not always be feasible in analog circuits. According to aspects of the disclosure, when the PWM generator is deactivated, it may be regarded as producing a PWM signal having a duty cycle of 0%. According to the present disclosure, the value Vc may be referred to as the cutoff voltage of the PWM generator. The value Vc may depend on the internal design of the PWM generator 200. Depending on design specifications, any suitable value for Vc may be achieved by those of ordinary skill in the art.

Figure 5:
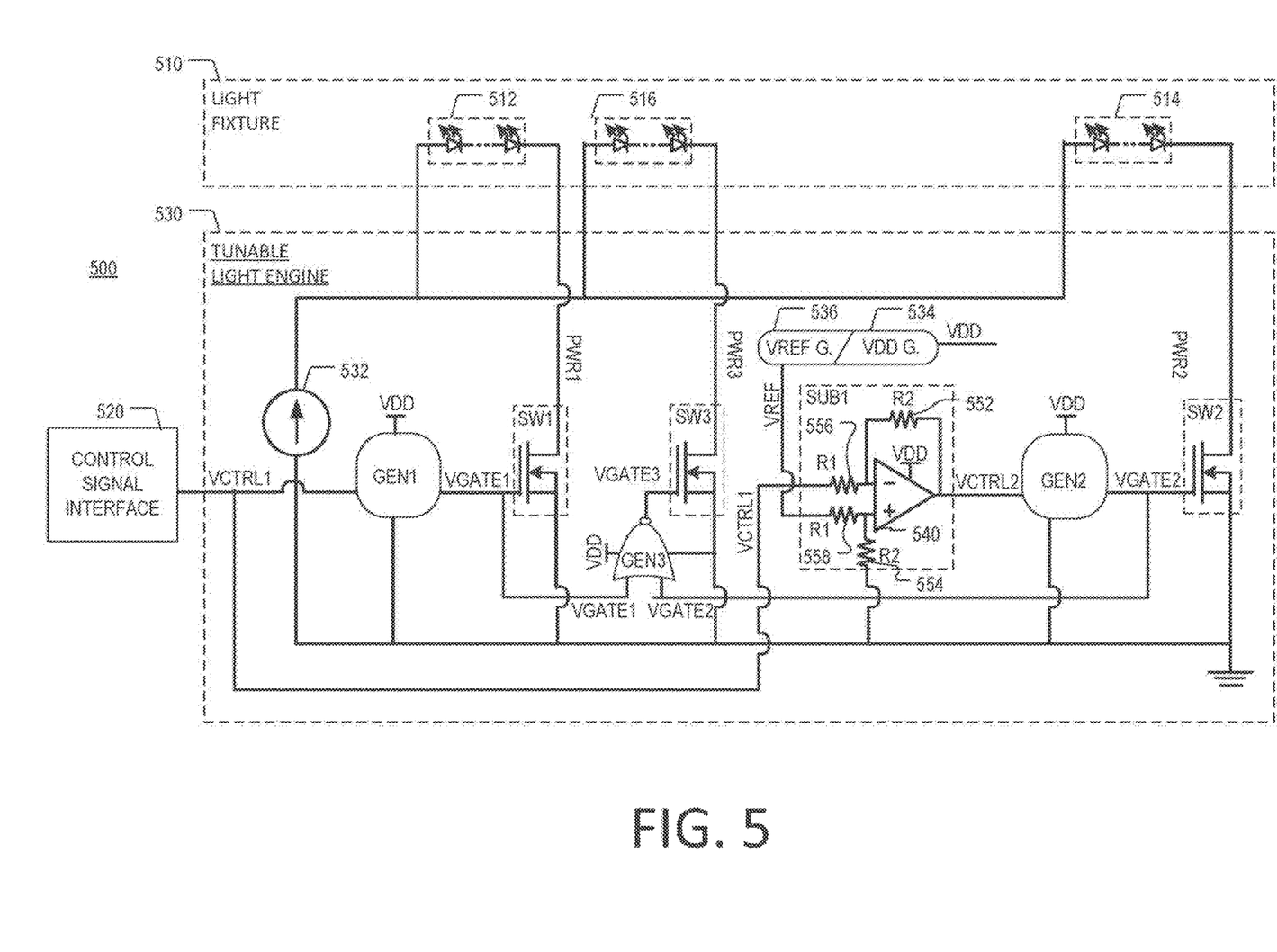
FIG. 5 is a diagram of an example of an illumination system, according to aspects of the disclosure.

FIG. 5 is a circuit diagram of an example of an illumination system 500, which uses PWM generators, such as the PWM generator 200 as one of its building blocks. As illustrated, the illumination system 500 may include a light fixture 510, a control signal interface 520, and a tunable light engine 530.

The light fixture 510 may include a light source 512, a light source 514, and a light source 516. Each light source may include one or more respective LEDs. For example, the light source 512 may include one or more light emitting diodes (LEDs) that are configured to produce a first type of light. The light source 514 may include one or more LEDs that are configured to produce a second type of light. The light source 516 may include one or more LEDs that are configured to produce a third type of light. The three types of light may differ from one another in one or more of wavelength, color rendering index (CRI), correlated color temperature (CCT), and/or color. In some implementations, the first type of light may be a warm-white light, the second type of light may be a cool-white light, and the third type of light may be a neutral-white light. Additionally or alternatively, in some implementations, the first type of light may be a red light, the second type of light may be a green light, and the third type of light may be a blue light.

According to the present example, the light fixture 510 may be arranged to produce tunable white light by mixing the respective outputs of each of the light sources 512-516. In such instances, the light source 512 may be configured to emit warm-white light having CCT of approximately 2700K; the light source 514 may be configured to emit cool-white light having a CCT of approximately 6500K; and the light source 516 may be configured to emit neutral-white light having a CCT of approximately 4000 CCT. As noted above, the output of the light fixture 510 may be a composite light output that is produced as a result of the emissions from the light sources 512-516 mixing with one another. The CCT of the composite light output may be varied by changing the respective brightness of each of light sources based on a control signal VCRL1, which is generated by the control signal interface 520.

The control signal interface 520 may include any suitable type of circuit or a device that is configured to generate a voltage control signal VCTRL1 and provide the control signal VCTRL1 to the tunable light engine 530. Although in the present example the control signal interface 520 and the tunable light engine 530 are depicted as separate devices, alternative implementations are possible in which the control signal interface 520 and the tunable light engine 530 are integrated together in the same device. For example, in some implementations, the control signal interface 520 may include a potentiometer coupled to a knob or slider, which is operable to generate the control signal VCTRL1 based on the position of the knob (or slider). As another example, the control signal interface may include a wireless receiver (e.g., a Bluetooth receiver, a Zigbee receiver, a WiFi receiver, etc.) which is operable to receive one or more data items from a remote device (e.g., a smartphone or a Zigbee gateway) and output the control signal VCTRL1 based on the data items. As another example, the control signal interface 520 may include an autonomous or semi-autonomous controller which is configured to generate the control signal VCTRL1 based on various control criteria. Those control criteria may include one or more of time of day, current date, current month, current season, etc.

The tunable light engine 530 may be a three-channel light engine. The tunable light engine 530 may be configured to supply power to each of the light sources 512-516 over a different respective channel. The tunable light engine 530 may include a current source 532, a voltage regulator 534, and a reference voltage generator 536. The voltage regulator 534 may be configured to generate a voltage VDD that is used for powering various components of the tunable light engine 530, as shown. The reference voltage generator 536 may be configured to generate a reference voltage signal VREF. The impact of the signal VREF on the operation of the tunable light engine 530 is discussed further below.

The tunable light engine 530 may be operable to drive the light source 512 by using a first PWM signal PWR1 which is supplied to the light source 512 over a first channel. The signal PWR1 may be generated by using a first signal generator GEN1 and a first switch SW1. The generator GEN1 may be the same or similar to the PWM generator 200 which is discussed with respect to FIG. 2, and it may have a cutoff voltage $Vc_1$. The switch SW1 may be a MOSFET transistor. The light source 512 may be connected to the current source 532 across the drain-source of the MOSFET transistor SW1, and the gate of the MOSFET transistor SW1 may be arranged to receive a PWM signal VGATE1 which is generated by the signal generator GEN1. As can be readily appreciated, this arrangement may result in the switch SW1 imparting on the signal PWR1 a duty cycle that is the same or similar to that of the signal VGATE1. The duty cycle of the signal VGATE1 may be dependent on the magnitude (e.g., level) of the control signal VCTRL1, as shown in FIG. 3.

The tunable light engine 530 may be operable to drive the light source 514 by using a second PWM signal PWR2 which is supplied to the light source 514 over a second channel. The signal PWR2 may be generated by using a second signal generator GEN2 and a second switch SW2. The generator GEN2 may be the same or similar to the PWM generator 200 which is discussed with respect to FIG. 2, and it may have a cutoff voltage $Vc_2$. The cutoff voltage $Vc_2$ of the signal generator GEN2 may be the same or different from the cutoff voltage $Vc_1$ of the signal generator GEN1. The switch SW2 may be a MOSFET transistor. The light source 514 may be connected to the current source 532 across the drain-source of the MOSFET transistor SW2, and the gate of the MOSFET transistor SW2 may be arranged to receive a PWM signal VGATE2 which is generated by the signal generator GEN2. As can be readily appreciated, this arrangement may result in the switch SW2 imparting on the signal PWR2 a duty cycle that is the same or similar to that of the signal VGATE2. The duty cycle of the signal VGATE2 may be dependent on the magnitude (e.g., level) of a voltage control signal VCTRL2, as shown in FIG. 3.

The control signal VCTRL2 may be a voltage signal. Furthermore, as noted above, the signals VCTRL1 and VREF may also be voltage signals. In this regards, the control signal VCTRL2 may be generated by subtracting the voltage of first control signal VCTRL1 from the voltage of the reference signal VREF. For example, when the reference signal VREF is 10V and the control signal VCTRL1 is 3V, the control signal VCTRL2 may equal 7V. The control signal VCTRL2 may be generated using a voltage subtracting circuit SUB1. The subtracting circuit SUB1 may include an operational amplifier (opamp) 540 configured to operate as a voltage subtractor. Furthermore, the subtracting circuit SUB1 may include resistors 552, 554, 556, and 558. Resistors 552 and 554 may both have a resistance R2. Resistors 556 and 558 may both have a resistance R1. Resistance R2 may be the same or different from resistance R1. Resistor 552 may be disposed between the output terminal and the inverting input terminal of the opamp 540, as shown. Resistor 554 may be coupled between the non-inverting input terminal of the opamp 540 and Ground. Resistor 556 may be coupled between the inverting terminal of the opamp 540 and the control signal interface 520. Resistor 558 may be coupled between the non-inverting terminal of the opamp 540 and the control reference voltage generator 536. In operation, the opamp 540 may: (i) receive the control signal VCTRL1 as a first input, (ii) receive the reference signal VREF as a second input, and generate the control signal VCTRL2 based on the control signal VCTRL1 and the reference signal VREF. The magnitude of the control signal VCTRL2 may be described by Equation 2 below:

$$VCTRL2 = (VREF - VCTRL1)\frac{R2}{R1} \qquad \text{Equation 2}$$

The tunable light engine 530 may be operable to drive the light source 516 by using a third PWM signal PWR3 which is supplied to the light source 516 over a third channel. The signal PWR3 may be generated by using a third signal generator GEN3 and a third switch SW3. The switch SW2 may be a MOSFET transistor. The light source 516 may be connected to the current source 552 across the drain-source of the MOSFET transistor SW3, and the gate of the MOSFET transistor SW3 may be arranged to receive a PWM signal VGATE3 which is generated by the signal generator GEN3. As can be readily appreciated, this arrangement may result in the switch SW3 imparting on the signal PWR3 a duty cycle that is the same or similar to that of the signal VGATE3. The signal VGATE3 may be generated by the generator GEN3 based on the signals VGATE1 and VGATE2. In some implementations, the signal generator GEN3 may include a NOR gate. As illustrated in FIG. 5, the NOR gate may receive the signals VGATE1 and VGATE2 as inputs and generate the signal VGATE3 by performing a NOR operation on the signals VGATE1 and VGATE2.

Figure 6A:
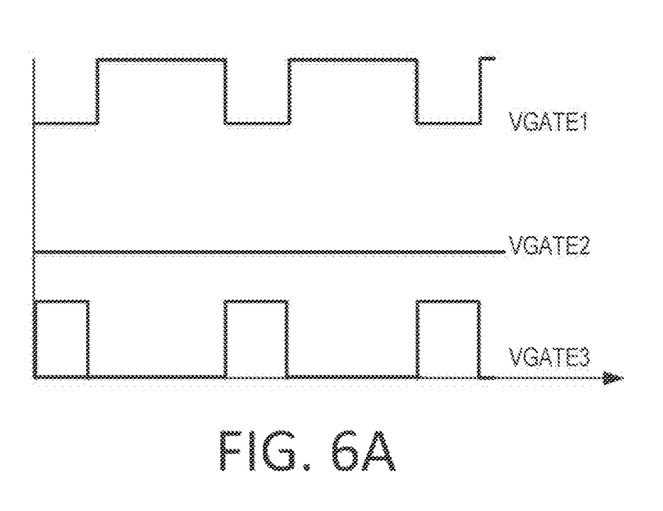
FIG. 6A is a plot illustrating the relationship between different PWM signals, according to aspects of the disclosure, according to aspects of the disclosure.
Figure 6B:
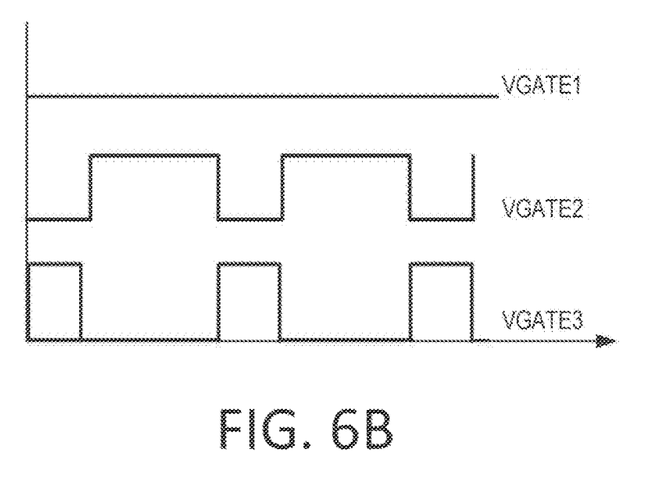
FIG. 6B is a plot illustrating the relationship between different PWM signals, according to aspects of the disclosure, according to aspects of the disclosure.

As illustrated in FIGS. 6A-B, one or more of: (i) the value (e.g., level) of the voltage signal VREF, (ii) the value (e.g., level) of the cutoff voltage Vc1 of the signal generator GEN1, and (iii) the value (e.g., level) of the cutoff voltage Vc2 of the signal generator GEN2 may be selected such that only one of the signals VGATE1 and VGATE2 is at a logic high at any given time. This may be needed so that current from the current source 532 can be diverted to only one channel (e.g., only one of the light-sources 512-516) at any given time. In some implementations, diverting current from the current source 532 to only one channel at any given time may be advantageous as it may permit a more precise control over the brightness of the light sources 512-516.

In some implementations, as illustrated in FIGS. 6A-B, one of the signals VGATE1 and VGATE2 may always have a duty cycle of 0%, while the other may have a duty cycle that is greater than 0%. In such instances, the signal VGATE3 may be generated by inverting a given one of the signals VGATE1 and VGATE2 which has the greater duty cycle. As a result, the sum of the duty cycles of the given one of the signals VGATE1 and VGATE2 which has the greater duty cycle, and the signal VGATE3 may equal 100%. Stated succinctly, in the example of FIGS. 6A-B, the signal VGATE3 is the inverse of one of the signals VGATE1 and VGATE2. According to aspects of the disclosure, one PWM signal is the inverse of another PWM signal when the value of the former signal is the opposite of the latter. For instance, as shown in FIG. 6A, the signal VGATE3 may be considered to be the inverse of the signal VGATE1 because the signal VGATE3 is at a logic high at all times when the signal VGATE1 is at a logic low, and vice versa.

Stated succinctly, in some implementations, the tunable light engine 530 may steer the current generated by the current source 532 into three pulse-width modulated channels (e.g., PWR1, PWR2, PWR3) with the sum of their duty cycles being unity. This effect may be achieved by: (i) ensuring that only one of the signals VGATE1 and VGATE2 is at a logic high value at any given time, (ii) and ensuring that the signal VGATE3 is the inverse of one of the signals VGATE1 and VGATE2 that has the greater duty cycle. Diverting the current from current source 532 in this manner may help achieve a more precise control over the brightness of the light output from the light sources 512-516.

As noted above, the operation of the tunable light engine 530 may be dependent on one or more of the magnitude of the reference signal VREF, the cutoff voltage $Vc_1$ of the signal generator GEN1, the cutoff voltage $Vc_2$ of the signal generator GEN2, and the ratio R2/R1. The present disclosure is not limited to any specific value for the reference signal VREF, the cutoff voltage $Vc_1$ of the signal generator GEN1, the cutoff voltage $Vc_2$ of the signal generator GEN2, and the ratio R2/R1. The value of any of these variables may vary in different configurations of the illumination system 500, and it may be selected in accordance with desired design specifications.

The control signal VCTRL1, as discussed above, may be generated by the control signal interface 520 in response to a user input indicating a desired CCT (and/or color) for the light that is output by the light fixture 510. The control signal VCTRL1 may thus be a voltage signal indicating a desired CCT (and/or color) for the light that is emitted from the light fixture 510.

The control signal VCTRL1 may determine when the light source 512 will be switched off. More particularly, when the magnitude of the control signal VCTRL1 exceeds the cutoff voltage $Vc_1$ of the signal generator GEN1, the light source 512 may be switched off. The reference signal VREF may determine when the light source 516 will be switched on. If the value of the reference signal VREF is lower than double the cutoff voltage $Vc_1$ of the signal generator GEN1, the light source 514 may be switched on before the light source 512 is switched off. By contrast, if the value of the reference signal VREF is higher than double the cutoff voltage $Vc_1$ of the signal generator GEN1, the light source 514 may be switched on before the light source 512 is switched off. Similarly, when the signal VREF is equal to double the cutoff voltage $Vc_1$ of the signal generator GEN1, the light source 514 may be switched at the same time when the light source 512 is switched off.

The ratio R2/R1 may determine the rate at which the brightness of the light source 514 changes in response to changes in the signal VCTRL1. This, in turn, may affect the responsiveness of the illumination system 500 to user input. As noted above, in some implementations, the light source 514 may be a cool-white light source and the control signal VCRL1 may be generated by the control signal interface 520 in response to the user turning a knob. In such instances, when the ratio R2/R1 is high, the light output of the illumination system 500 will turn cool more abruptly when the knob is turned. By contrast, when the ratio R2/R1 is low, the light output of the illumination system 500 may turn cool more slowly when the knob is actuated.

Figure 7:
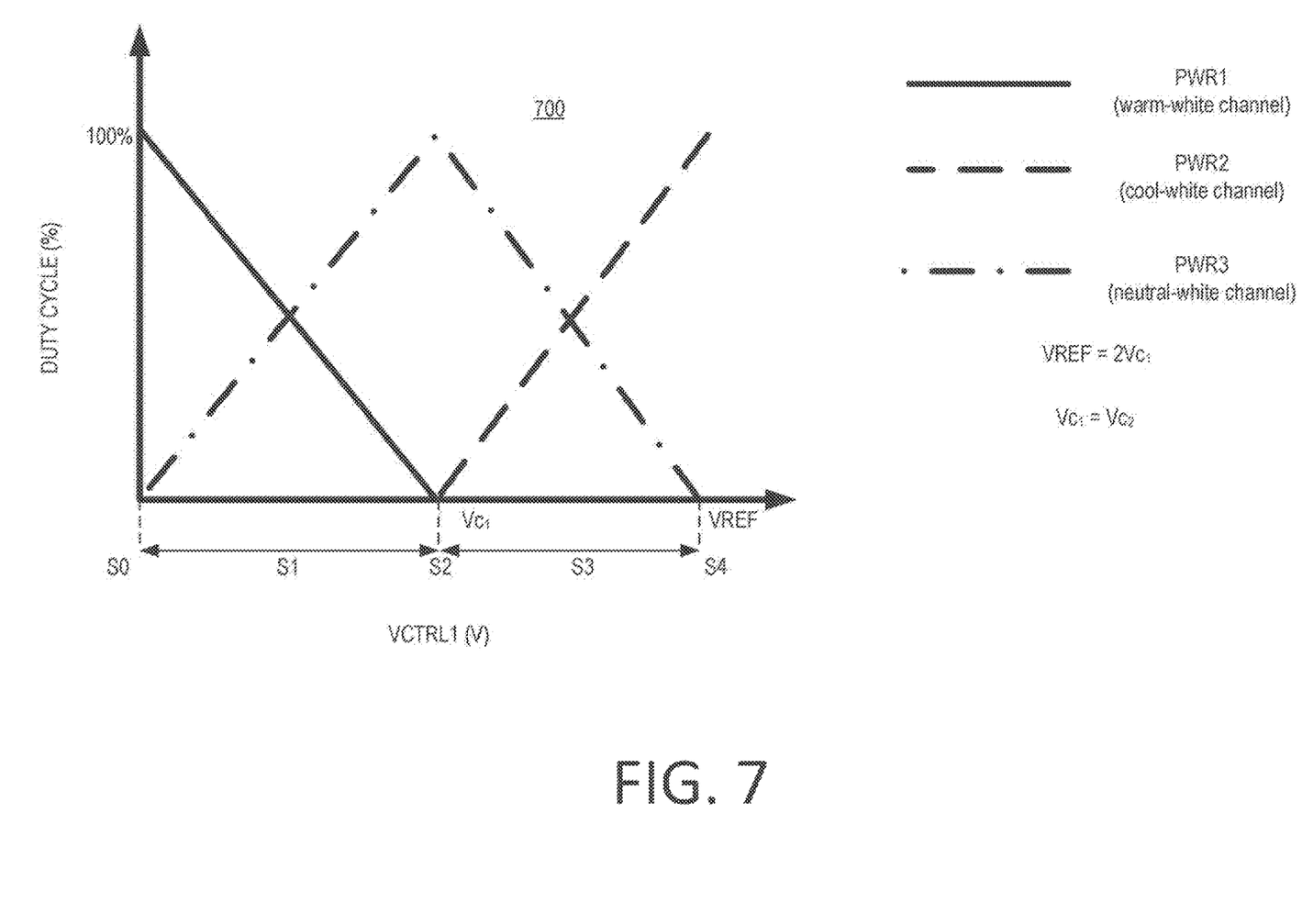
FIG. 7 is a plot illustrating the operation of the illumination system of FIG. 5, in accordance with one possible configuration.

FIG. 7 shows a plot 700 illustrating the operation of the illumination system 500, in accordance with one possible configuration of the tunable light engine 530. In this configuration, the cutoff voltage $Vc_1$ of the signal generator GEN1 is the same as the cutoff voltage Vc2 of the signal generator GEN2, and the magnitude of the reference signal VREF equals double the cutoff voltage $Vc_1$. The plot 700 shows the relationship between the respective duty cycle of each of the signals PWR1, PWR2, and PWR3 and the control signal VCTRL1. Furthermore, the plot 700 illustrates that the illumination system 500 may have at least five operational states, which are herein enumerated as states S0-S4.

The illumination system 500 may be in the state S0 when the control signal VCTRL1 is equal to 0V (VCTRL1=0V). When the illumination system 500 is in the state S0, the light source 512 may be switched on (at maximum capacity), and the light sources 514 and 516 may be switched off.

The illumination system 500 may be in the state S1 when the control signal VCTRL1 is greater than 0V and less than the cutoff voltage $Vc_1$ of the signal generator GEN1 (0<VCTRL1<$Vc_1$). When the illumination system 500 is in the state S1, the light sources 512 and 516 may be switched on, and the light source 514 may be switched off.

The illumination system 500 may be in the state S2 when the control signal VCTRL1 is equal to the cutoff voltage $Vc_1$ of the signal generator GEN1 (VCTRL1=$Vc_1$). When the illumination system 500 is in the state S2, the light source 516 may be switched on (at maximum capacity), and the light sources 512 and 514 may be switched off.

The illumination system 500 may be in the state S3 when the control signal VCTRL1 is greater than the cutoff voltage $Vc_1$ of the signal generator GEN1 and less than the reference signal VREF ($Vc_1$<VCTRL1<VREF). When the illumination system 500 is in the state S3, the light sources 514 and 516 may be switched on, and the light source 512 may be switched off.

The illumination system 500 may be in the state S4 when the control signal VCTRL1 is greater than or equal to VREF (VCTRL1≥VREF). When the illumination system 500 is in the state S4, the light source 514 may be switched on (at maximum capacity), and the light sources 512 and 516 may be switched off.

Figure 8:
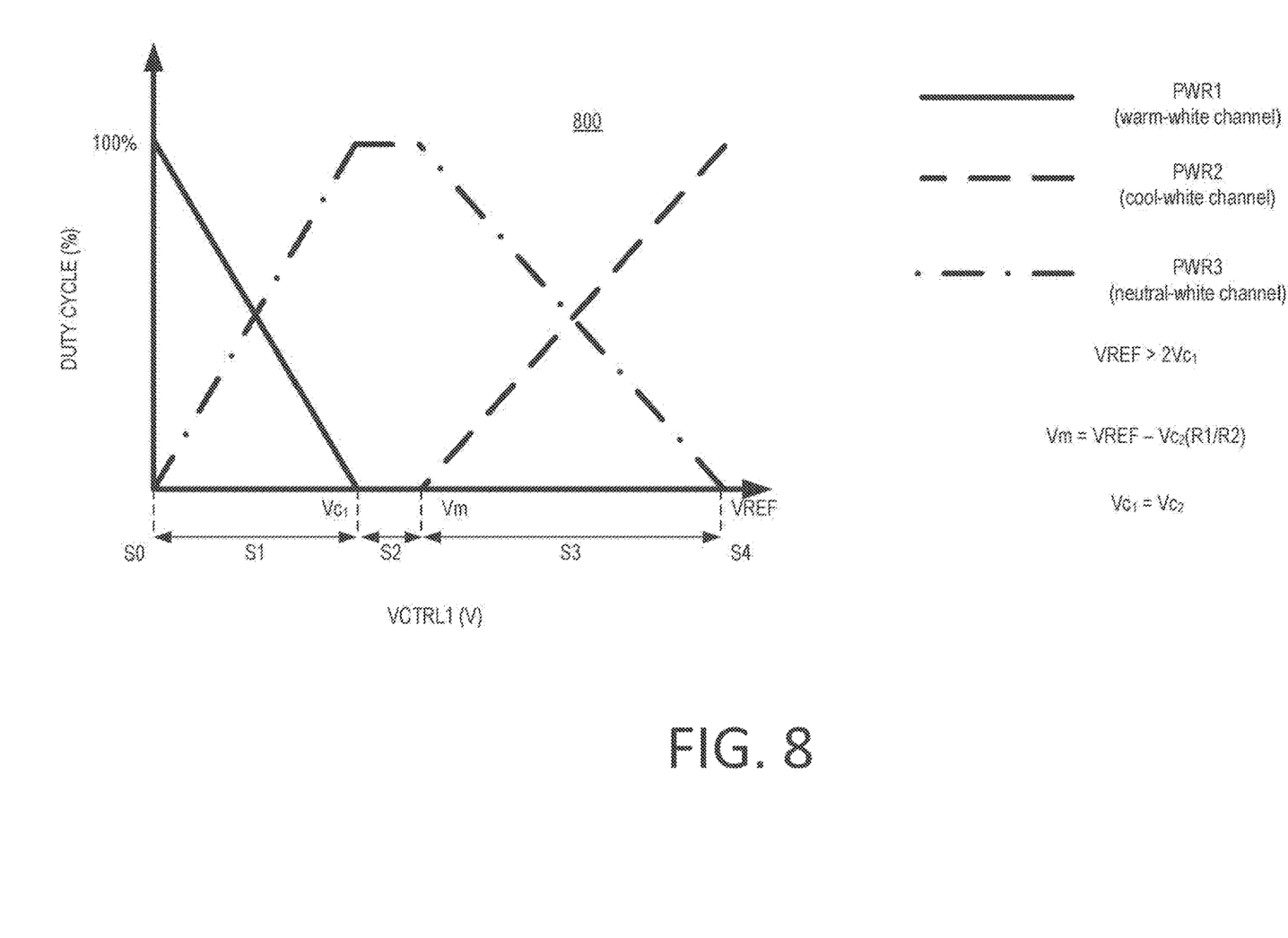
FIG. 8 is a plot illustrating the operation of the illumination system of FIG. 5, in accordance with another possible configuration.

FIG. 8 shows a plot 800 illustrating the operation of the illumination system 500, in accordance with another possible configuration of the tunable light engine 530. In this configuration, the cutoff voltage $Vc_1$ of the signal generator GEN1 is the same as the cutoff voltage $Vc_2$ of the signal generator GEN2, and the magnitude of the reference signal VREF is greater than double the magnitude cutoff voltage $Vc_1$. The plot 800 shows the relationship between respective duty cycle of each of the signals PWR1, PWR2, and PWR3 and the control signal VCTRL1. Furthermore, the plot 800 illustrates that the illumination system 500 may have at least five operational states, which are herein enumerated as states S0-S4.

The illumination system 500 may be in the state S0 when the control signal VCTRL1 is equal to 0V (VCTRL1=0V). When the illumination system 500 is in the state S0, the light source 512 may be switched on (at maximum capacity), and the light sources 514 and 516 may be switched off.

The illumination system 500 may be in the state S1 when the control signal VCTRL1 is greater than 0V and less than the cutoff voltage $Vc_1$ of the signal generator GEN1 (0<VCTRL1<$Vc_1$). When the illumination system 500 is in the state S1, the light sources 512 and 516 may be switched on, and the light source 514 may be switched off.

The illumination system 500 may be in the state S2 when the control signal VCTRL1 is greater than or equal to the cutoff voltage $Vc_1$ of the signal generator GEN1 and less than or equal to Vm ($Vc_1$≤VCTRL1≤Vm). When the illumination system 500 is in the state S2, the light source 516 may be switched on (at maximum capacity), and the light sources 512 and 514 may be switched off. In some implementation, the value Vm may be defined by Equation 3 below:

$$Vm = VREF - V_{C_2} * \left(\frac{R1}{R2}\right) \quad \text{Equation 3}$$

The illumination system 500 may be in the state S3 when the control signal VCTRL1 is greater than Vm and less than the reference signal VREF (Vm<VCTRL1<VREF). When the illumination system 500 is in the state S3, the light sources 514 and 516 may be switched on, and the light source 512 may be switched off. Accordingly, Vm may be the value for the control signal VCTRL1 at which the light source 514 is switched on.

The illumination system 500 may be in the state S4 when the control signal VCTRL1 is greater than or equal to the reference signal VREF (VCTRL1≥VREF). When the illumination system 500 is in the state S4, the light source 514 may be switched on (at maximum capacity), and the light sources 512 and 516 may be switched off.

Figure 9:
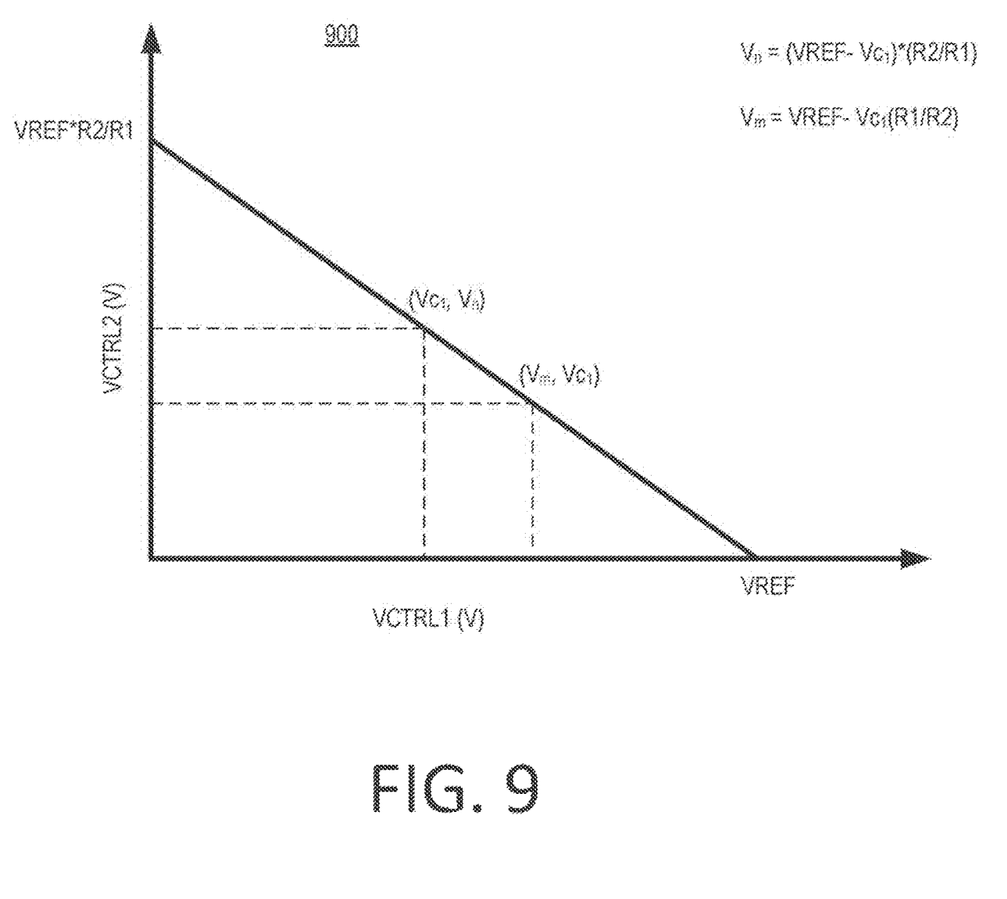
FIG. 9 is a plot illustrating the relationship between different control signals in the illumination system of FIG. 5, according to aspects of the disclosure.

FIG. 9 shows a plot 900 which illustrates the relationship between the control signals VCTRL1 and VCTRL2, in accordance with the configuration of the illumination system 500 that is discussed with respect to FIG. 8. As shown, when the control signal VCTRL1 reaches the value of the cutoff voltage $Vc_1$ of the signal generator GEN1, the light source 512 may be switched off and the light source 516 may reach 100% brightness. When the control signal VCTRL1 surpasses the value Vm, the brightness of the light source 516 may start to decrease. Furthermore, for values between of VCTRL1 between $Vc_1$ and Vm, the light source 516 may operate at maximum brightness and the light sources 512 and 514 may be switched off.

The plots 700 and 800 illustrate that the illumination system 500 may permit the user to change the color and/or CCT of the light output produced by the illumination system 500, without affecting the total brightness of the light that is emitted from the illumination system 500. This concept is illustrated in the plots 700 and 800. As illustrated in the plots 700 and 800, the lines representing the signals PWR1 and PWR2 may have slopes that are equal in magnitude, but opposite in sign, to the slope of the line representing the signal PWR3. This implies that any decrease in brightness of one of the light source 512 and the light source 514 may be matched by an equal increase in brightness of the light source 516, and vice versa. Thus, in some implementations, when the CCT (or color) of the light output of the illumination system 500 is changed (as a result of the control signal VCTRL1 changing), that change may take place without any increase or decrease in brightness of the illumination system's 500 light output.

Figure 10:
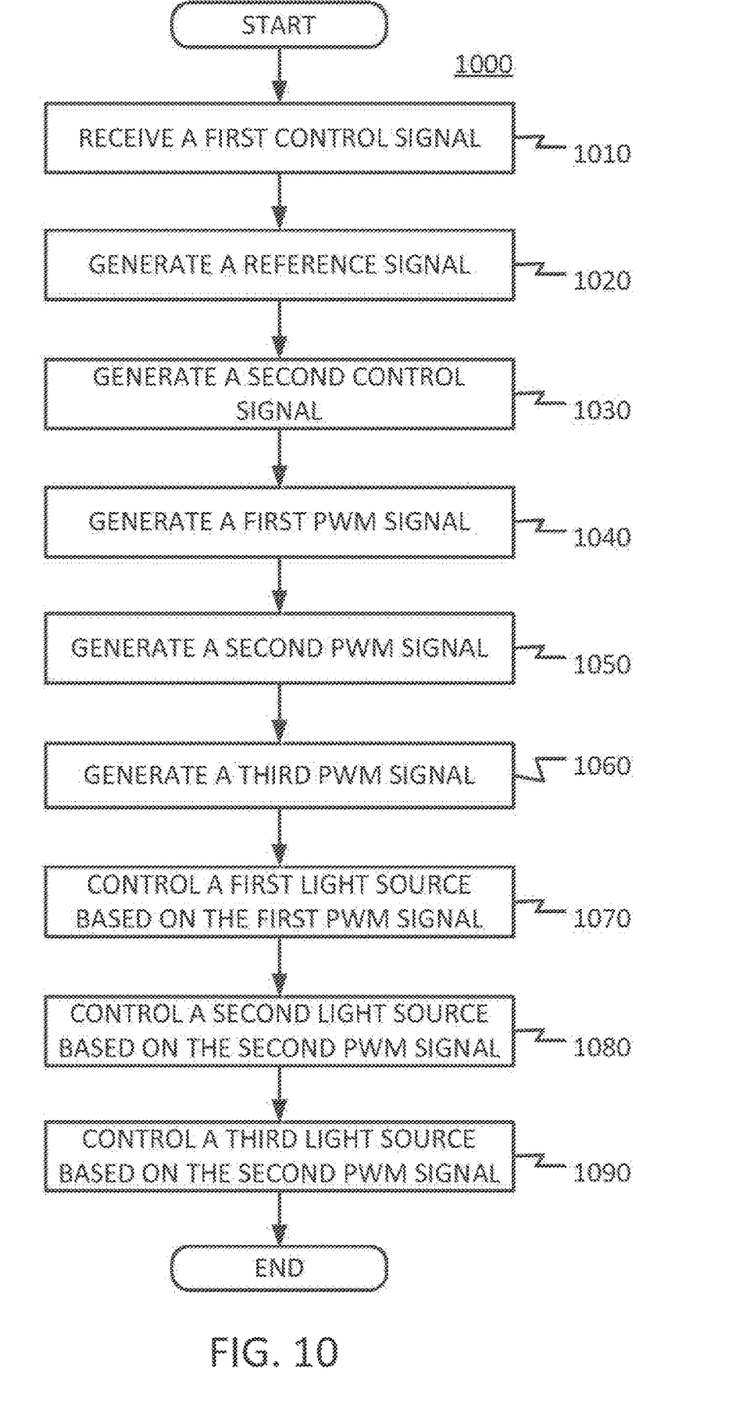
FIG. 10 is a flowchart of an example of a process, according to aspects of the disclosure.

FIG. 10 is a flowchart of an example of the process, according to aspects of the disclosure. In some implementations, all steps in the process 1000 may be performed concurrently. Additionally or alternatively, in some implementations, some or all steps in the process 1000 may be performed sequentially. The process 1000 may be performed by the illumination system 100, the illumination system 500, and/or any other suitable type of electronic device. For example, in some implementations, at least some of the steps in the process 1000 may be performed using processing circuitry, such as a microprocessor (e.g., an ARM-based processor, an Arduino-based processor, etc.) Additionally or alternatively, in some implementations, at least some of the steps in the process 1000 may be performed by using an electronic circuit, such as the one shown in FIG. 5.

At step 1010, a first control signal is received which indicates a desired CCT and/or a desired color for a light output. The control signal may be received from a control signal interface, such as the control signal interface 110 or 520. In some implementations, the control signal may be a voltage signal, such as the control signal VCTRL1. In some implementations, the control signal may be a digital representation of a number or an alphanumerical string which indicates a desired CCT and/or color. At step 1020, a reference signal is generated. In some implementations, the reference signal may be a voltage signal, such as the signal VREF. Additionally or alternatively, in some implementations, the reference signal may be a digital representation of a number and/or an alphanumerical string. At step 1030, a second control signal is generated based on at least one of the reference signal and the first control signal. In some implementations, the second control signal may be generated by subtracting the first control signal from the reference signal.

At step 1040, a first PWM signal is generated based on the first control signal. In some implementations, the first PWM signal may have a duty cycle that is based on the first control signal. In some implementations, the duty cycle of the first PWM signal may be proportional to the magnitude of the first control signal (e.g., proportional to a level of the first control signal).

At step 1050, a second PWM signal is generated. In some implementations, the duty cycle of the second PWM signal may be generated based on at least one of the first control signal and the reference signal. Additionally or alternatively, in some implementations, the second control signal may be generated based on the second control signal. Additionally or alternatively, in some implementations, the second PWM signal may have a duty cycle that is proportional to the magnitude of the second control signal.

At step 1060 a third PWM signal is generated based on at least one of the first PWM signal and the second PWM signal. In some implementations, the third PWM signal may have a duty cycle that is different from each of the first PWM signal and the second PWM signal. In some implementations, the third PWM signal may be generated by inverting one of the first PWM signal and the second PWM signal which has the greater duty cycle. Additionally or alternatively, in some implementations, the third PWM signal may be generated by performing a NOR operation on the first PWM signal and the second PWM signal.

At step 1070 a first light source is controlled based on the first PWM signal. The first light source may include one or more LEDs and/or any other suitable type of light source. In some implementations, controlling the first light source may include switching on and/or switching off the first light source based on the first PWM signal. Additionally or alternatively, in some implementations, controlling the first light source may include increasing and/or decreasing the brightness of the first light source. Additionally or alternatively, in some implementations, controlling the first light source may include changing the state of a switch, which controls the flow of current across the first light source, based on the first PWM signal.

At step 1080 a second light source is controlled based on the second PWM signal. The second light source may include one or more LEDs and/or any other suitable type of light source. In some implementations, controlling the second light source may include switching on and/or switching off the second light source based on the second PWM signal. Additionally or alternatively, in some implementations, controlling the second light source may include increasing and/or decreasing the brightness of the second light source. Additionally or alternatively, in some implementations, controlling the second light source may include changing the state of a switch, which controls the flow of current across the second light source, based on the second PWM signal.

At step 1090 a third light source is controlled based on the third PWM signal. The third light source may include one or more LEDs and/or any other suitable type of light source. In some implementations, controlling the third light source may include switching on and/or switching off the third light source based on the third PWM signal. Additionally or alternatively, in some implementations, controlling the third light source may include increasing and/or decreasing the brightness of the third light source. Additionally or alternatively, in some implementations, controlling the third light source may include changing the state of a switch, which controls the flow of current across the third light source, based on the third PWM signal.

FIGS. 1-10 are provided as an example only. Although in the example of FIG. 5, the switches SW1 and SW2 are implemented as MOSFET transistors, any suitable type of switch may be used instead, such as a solid-state relay, a PMOS transistor, etc. Although in the example of FIG. 5, the subtractor SUB1 is implemented using an opamp, any suitable type of electronic circuitry may be used instead to implement the subtractor. Although in the example of FIG. 3, the generator GEN3 is implemented using a NOR gate, any other suitable type of circuitry can be used instead. For example, the signal generator GEN3 may be implemented by using an OR gate and one or more inverters, etc. At least some of the elements discussed with respect to these figures can be arranged in different order, combined, and/or altogether omitted. It will be understood that the provision of the examples described herein, as well as clauses phrased as "such as," "e.g.", "including", "in some aspects," "in some implementations," and the like should not be interpreted as limiting the disclosed subject matter to the specific examples.

Having described the invention in detail, those skilled in the art will appreciate that, given the present disclosure, modifications may be made to the invention without departing from the spirit of the inventive concepts described herein. Therefore, it is not intended that the scope of the invention be limited to the specific embodiments illustrated and described.

What is claimed is:

1. A system comprising:
 a control signal interface configured to provide a control signal;
 a light engine communicatively coupled to the control signal interface, the light engine comprising:
  a first signal generator configured to provide a first pulse-width modulated (PWM) signal to an input of a first switch based on the control signal, the first signal generator having a first cutoff voltage at which the first PWM signal has a 0% duty cycle when the control signal reaches the first cutoff voltage;
  a second signal generator configured to provide a second PWM signal to an input of a second switch based on the control signal and a reference signal, the second signal generator having a second cutoff voltage at which the second PWM signal has a 0% duty cycle when the control signal reaches the second cutoff voltage, at least one of the reference signal, the first cutoff voltage, and the second cutoff voltage set such that only one of the first PWM signal and the second PWM signal is at a logic high value concurrently; and
  a NOR gate configured to receive the first PWM signal and the second PWM signal as inputs and provide a third PWM signal to an input of a third switch.

2. The system of claim 1, wherein:
 the second signal generator is configured to provide the second PWM signal based on a value proportional to a combination of the reference signal minus the control signal.

3. The system of claim 1, further comprising:
 an operational amplifier having a first input coupled to receive an inverted input of the control signal, a second input coupled to receive a non-inverting input of the reference signal, and an output configured to supply an output operational amplifier signal to the second signal generator and an inverted signal to the first input.

4. The system of claim 3, further comprising:
 a reference voltage generator configured to generate an initial reference signal; and
 a voltage divider configured to divide the initial reference signal to provide the reference signal.

5. The system of claim 4, wherein:
 the voltage divider comprises a first resistor between the reference voltage generator and the second input of the operational amplifier and a second resistor between the second input of the operational amplifier and ground, the first resistor having a first resistance and the second resistor having a second resistance, and
 the control signal is supplied to the first input of the operational amplifier through a third resistor having the first resistance and the output operational amplifier signal is connected to the first input of the operational amplifier through a fourth resistor having the second resistance.

6. The system of claim 5, wherein a ratio of the second resistance to the first resistance is configured to determine a rate at which a brightness of a light source connected to the second switch changes.

7. The system of claim 1, further comprising:
 a first light emitting diode (LED) coupled to the first switch and configured to emit light of a first color;
 a second LED coupled to the second switch and configured to emit light of a second color; and
 a third LED coupled to the third switch and configured to emit light of a third color.

8. The system of claim 7, wherein:
 the reference signal, the first cutoff voltage, and the second cutoff voltage are set to control a first duty cycle of the first PWM signal, a second duty cycle of the second PWM signal, and a third duty cycle of the third PWM signal to provide a correlated color temperature (CCT) based on a user input that sets the control signal.

9. The system of claim 8, wherein:
 the control signal is a digital representation of a number or an alphanumerical string that indicates the CCT.

10. The system of claim 1, wherein:
 the reference signal, the first cutoff voltage, and the second cutoff voltage are set to control a first duty cycle of the first PWM signal, a second duty cycle of the second PWM signal, and a third duty cycle of the third PWM signal such that as the control signal changes: one of the first and second duty cycles is 0% concurrently as each of the third duty cycle and another of the first and second duty cycles varies from 0% to 100%, and a total of the first, second, and third duty cycles is 100%.

11. The system of claim 10, wherein:
the reference signal, the first cutoff voltage, and the second cutoff voltage are set such that as the control signal increases:
the first duty cycle decreases linearly from 100% to 0% and the third duty cycle increases linearly from 0% to 100%, and
at the control signal at which the first duty cycle first reaches 0%, the second duty cycle starts to increase linearly from 0% to 100% and the third duty cycle starts to decrease linearly from 100% to 0%.

12. The system of claim 10, wherein:
the reference signal, the first cutoff voltage, and the second cutoff voltage are set such that as the control signal increases:
the first duty cycle decreases linearly from 100% to 0% and the third duty cycle increases linearly from 0% to 100%,
the first duty cycle reaches 0% at a first control signal, and
the second duty cycle starts to increase linearly from 0% to 100% and the third duty cycle starts to decrease linearly from 100% to 0% at a second control signal larger than the first control signal.

13. The system of claim 1, wherein:
the control signal interface is communicatively coupled to receive an input from an actuator; and
the light engine further comprises a controller communicatively coupled to receive a user input from the control signal interface and provide the control signal based thereon.

14. A method comprising:
generating a first pulse-width modulated (PWM) signal based on a control signal, the first PWM signal having a 0% duty cycle when the control signal reaches a first cutoff voltage;
generating a second PWM signal based on the control signal and a reference signal, the second PWM signal having a 0% duty cycle when the control signal reaches a second cutoff voltage;
setting at least one of the reference signal, the first cutoff voltage, and the second cutoff voltage such that only one of the first PWM signal and the second PWM signal is at a logic high value concurrently;
generating a third PWM signal based on a NOR combination of the first PWM signal and the second PWM signal; and
driving a first, a second, and a third light emitting diode (LED) respectively using the first, second, and third PWM signals, each of the first, second, and third LED configured to emit light of a different color.

15. The method of claim 14, further comprising:
controlling a first duty cycle of the first PWM signal, a second duty cycle of the second PWM signal, and a third duty cycle of the third PWM signal using the reference signal, the first cutoff voltage, and the second cutoff voltage to provide a correlated color temperature (CCT) based on a user input that sets the control signal.

16. The method of claim 15, further comprising:
providing the control signal as a digital representation of a number or an alphanumerical string that indicates the color blend or CCT.

17. The method of claim 14, further comprising:
setting the reference signal, the first cutoff voltage, and the second cutoff voltage to control a first duty cycle of the first PWM signal, a second duty cycle of the second PWM signal, and a third duty cycle of the third PWM signal such that as the control signal changes:
one of the first and second duty cycles is 0% concurrently as each of the third duty cycle and another of the first and second duty cycles varies from 0% to 100%, and
a total of the first, second and third duty cycles is 100%.

18. The method of claim 17, further comprising:
setting the reference signal, the first cutoff voltage, and the second cutoff voltage such that as the control signal increases:
the first duty cycle decreases linearly from 100% to 0% and the third duty cycle increases linearly from 0% to 100%, and
at the control signal at which the first duty cycle first reaches 0%, the second duty cycle starts to increase linearly from 0% to 100% and the third duty cycle starts to decrease linearly from 100% to 0%.

19. The method of claim 17, further comprising:
setting the reference signal, the first cutoff voltage, and the second cutoff voltage such that as the control signal increases:
the first duty cycle decreases linearly from 100% to 0% and the third duty cycle increases linearly from 0% to 100%,
the first duty cycle reaches 0% at a first control signal, and
the second duty cycle starts to increase linearly from 0% to 100% and the third duty cycle starts to decrease linearly from 100% to 0% at a second control signal larger than the first control signal.

20. A device comprising:
a current source configured to provide a current to a first, a second, and a third output;
a first signal generator configured to provide a first pulse-width modulated (PWM) signal to an input of a first switch based on a variable control signal provided via a user input, the first signal generator having a first cutoff voltage at which the first PWM signal has a 0% duty cycle when the control signal reaches the first cutoff voltage, the first switch connected with a first input and configured to provide a path to ground when the first input and output are electrically connected;
a second signal generator configured to provide a second PWM signal to an input of a second switch based on the control signal and a reference signal, the second signal generator having a second cutoff voltage at which the second PWM signal has a 0% duty cycle when the control signal reaches the second cutoff voltage, at least one of the reference signal, the first cutoff voltage, and the second cutoff voltage set such that only one of the first PWM signal and the second PWM signal is at a logic high value concurrently, the second switch connected with a second input and configured to provide a path to ground when the second input and output are electrically connected; and
a NOR gate configured to receive the first PWM signal and the second PWM signal as inputs and provide a third PWM signal to an input of a third switch, the third switch connected with a third input and configured to provide a path to ground when the third input and output are electrically connected.

21. The device of claim 20, further comprising:
an operational amplifier having a first input coupled to receive an inverted input of the control signal, a second input coupled to receive a non-inverting input of the reference signal, and an output configured to supply an output operational amplifier signal to the second signal generator and an inverted signal to the first input.

22. The device of claim 21, further comprising:
a reference voltage generator configured to generate an initial reference signal; and
a voltage divider configured to divide the initial reference voltage to provide the reference signal, the voltage divider comprising a first resistor between the reference voltage generator and the second input of the operational amplifier and a second resistor between the second input of the operational amplifier and ground, the first resistor having a first resistance and the second resistor having a second resistance, the control signal supplied to the first input of the operational amplifier through a third resistor having the first resistance and the output operational amplifier signal is connected to the first input of the operational amplifier through a fourth resistor having the second resistance.

* * * * *